(12) United States Patent
Bucklen et al.

(10) Patent No.: US 10,615,674 B2
(45) Date of Patent: Apr. 7, 2020

(54) ROTATING ELECTRICAL MACHINE WITH REMOVABLE HEATING ELEMENTS

(71) Applicant: Siemens Industry, Inc., Alpharetta, GA (US)

(72) Inventors: Eric Bucklen, New Florence, PA (US); William Dixon, Mason, OH (US); Rajendra Mistry, Cincinnati, OH (US); Claude Turner, Batavia, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 117 days.

(21) Appl. No.: 15/898,824

(22) Filed: Feb. 19, 2018

(65) Prior Publication Data

US 2018/0287470 A1    Oct. 4, 2018

Related U.S. Application Data

(60) Provisional application No. 62/479,590, filed on Mar. 31, 2017.

(51) Int. Cl.
| | |
|---|---|
| *H02K 15/12* | (2006.01) |
| *H02K 5/18* | (2006.01) |
| *H02K 15/14* | (2006.01) |

(52) U.S. Cl.
CPC ............ *H02K 15/125* (2013.01); *H02K 5/18* (2013.01); *H02K 15/14* (2013.01)

(58) Field of Classification Search
CPC ...... H02K 15/00; H02K 15/12; H02K 15/125; H02K 15/14; H02K 15/16; H02K 15/167; H02K 15/1672; H02K 15/18; H02K 15/22; H02K 15/225; H02K 9/18; H02K 9/19; H02K 11/00; H02K 11/0094; H02K 11/25; H02K 11/40; H02K 11/33; H02K 19/34; H02K 19/36; H02K 19/365
See application file for complete search history.

(56) References Cited

U.S. PATENT DOCUMENTS

| | | | |
|---|---|---|---|
| 5,787,568 A * | 8/1998 | Crowell | H02K 15/125 29/596 |
| 6,198,186 B1 * | 3/2001 | Wallace | H02K 15/125 219/201 |

* cited by examiner

*Primary Examiner* — Tran N Nguyen

(57) ABSTRACT

A rotating electrical machine with one or more heating elements is provided in that the one or more heating elements mount circumferentially on an inside of a frame or enclosure of the rotating electrical machine. The rotating electrical machine comprises an enclosure with multiple cooling fins, insulated stator windings positioned inside the enclosure, and a heating element positioned inside the enclosure. The heating element provides suitable heating of the insulated stator windings through heated air to prevent condensation while being physically decoupled from an insulation of the insulated stator windings.

11 Claims, 4 Drawing Sheets

View A-A'

View B-B'

ROTATING ELECTRICAL MACHINE WITH REMOVABLE HEATING ELEMENTS

CROSS REFERENCE TO RELATED APPLICATIONS

This application claims the benefit of U.S. Provisional Application Ser. No. 62/479,590 entitled "ELECTRODYNAMIC MACHINE WITH REMOVABLE HEATING ELEMENTS," filed on Mar. 31, 2017, the contents of which are hereby incorporated by reference herein in their entirety.

BACKGROUND

1. Field

Aspects of the present invention generally relate to rotating electrical machines, generally referred to as electric machines, such as electric motors or generators, and in particular to removable, low-cost and low-temperature heating elements for electric machines such as fin-cooled ones.

2. Description of the Related Art

Anti-condensation heating prevents moisture from collecting on the stator and bearings of a de-energized electric motor. However, because electric motors are optimized for compactness and heat dissipation, electric motor enclosures typically leave minimal internal space for accessories, forcing motor manufacturers to lash flexible heating elements directly to the stator winding. The heat conducted directly to the organic stator insulation can accelerate its breakdown, and if a heating element fails, it is difficult or impossible to remove from the winding without causing damage. Some industrial standards explicitly disallow installation of heating elements directly on the insulated stator winding.

In the past, tubular or strip or other form heating elements have been attached to the motor's end bells or frame, but achieving a low heating element surface temperature (required for hazardous area service and to meet some safety standards) while providing enough heat to prevent condensation is difficult with the tubular or strip or other form, especially in frames with restricted space, and installation of these elements is relatively difficult. Fins can be attached to the tubular heating element to lower its surface temperature which further increases the difficulty of installation.

Therefore, there is a need for easy to install heating elements on electric machines while decreasing the difficulty of assembly compared with other options.

SUMMARY

Briefly described, aspects of the present invention relate to a set of thin, curved heating elements that mount circumferentially on the inside of a motor frame, just axially inside bearing brackets, avoiding contact with insulated stator windings. This solution is innovative because there is a currently unmet market demand for removable heating elements on a restricted area electrical machine. Embodiments of the present invention decrease the difficulty of assembly compared with other options such as tubular-shaped heaters.

In accordance with one illustrative embodiment of the present invention, a rotating electrical machine is provided. It comprises an enclosure, insulated stator windings positioned inside the enclosure and a heating element positioned inside the enclosure. The heating element provides suitable heating of the insulated stator windings through heated air to prevent condensation while being physically decoupled from an insulation of the insulated stator windings.

In accordance with another illustrative embodiment of the present invention, a fin-cooled motor is provided. It comprises a motor frame with multiple cooling fins and a yoke, a stator with insulated stator windings positioned inside the motor frame and a plurality of removable heaters mounted circumferentially between the stator and the motor frame while connected as one circuit in series or parallel connection depending upon a desired power available and brought to one terminal box. The plurality of removable heaters provide heating of the insulated stator windings while being physically decoupled from an insulation of the insulated stator windings of the stator.

In accordance with another illustrative embodiment of the present invention, a method of providing a space heater to prevent condensation in an electric machine such as a motor or a generator is provided. The method comprises providing a curved semi-rigid mounting plate with an active, flexible, insulated and removable heater attached thereto and mounting the curved semi-rigid mounting plate with the active, flexible, insulated and removable heater to a motor frame such that the combination of the curved semi-rigid mounting plate and the active, flexible, insulated and removable heater fits between a stator and the motor frame of the motor, but remains physically detached from a plurality of stator windings and an insulation as a result of an air gap in therebetween.

DETAILED DESCRIPTION

To facilitate an understanding of embodiments, principles, and features of the present invention, they are explained hereinafter with reference to implementation in illustrative embodiments. In particular, they are described in the context of a heating element comprising a mounting plate and an active heater installed within a motor frame to prevent condensation in a motor. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

According to an exemplary embodiment of the present invention, a set of thin, curved heating elements is provided that mount circumferentially on an inside of a frame or enclosure of an electric machine, just axially inside bearing brackets, avoiding contact with insulated stator windings. A heating element comprises a mounting plate and an active heater. In an example, an active heater itself is a flat, flexible, silicone-sheathed panel affixed such as glued to a semi-rigid mounting plate (backing plate), which is pre-formed to a same diameter as an inside surface of the machine frame. The mounting plate has tabs that are used to attach the mounting plate to the inner surface of the frame. The mounting plate can comprise aluminum and can be configured as aluminum mounting plate but which can be any metallic material plate. The thin but rigid form of the heating element allows the heating element to slide round the stator coils while maintaining a gap that physically decouples the heating element from the insulation of the stator windings and provides removal of the heating element without damage. The provided solution of the heating element is made more universal by virtue of the silicone heating element being the same one traditionally lashed to the stator winding. The heating elements are configured as anti-condensation heaters not lashed to the stator windings and with a surface temperature below 160° C.

Figure 1:
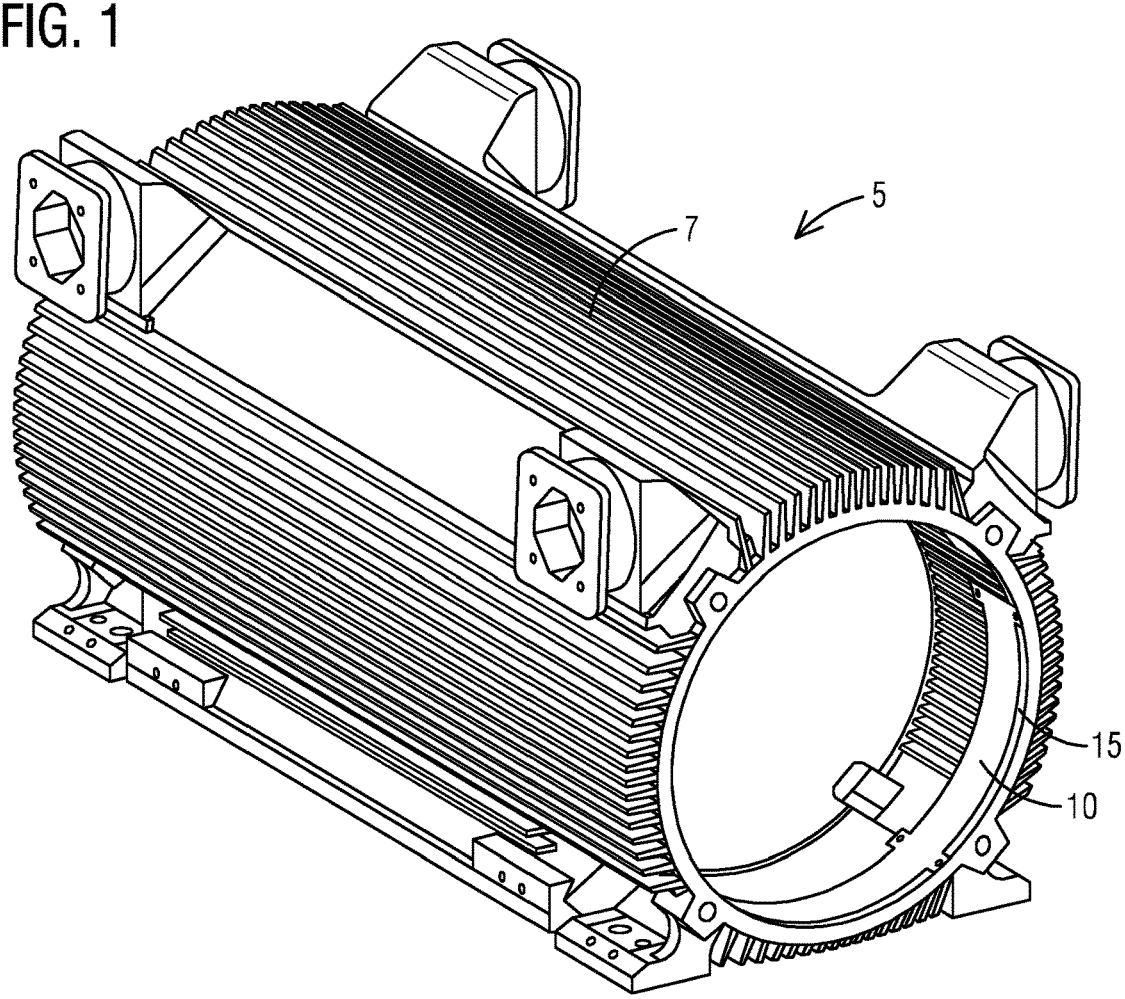
FIG. 1 illustrates a perspective view of a frame or enclosure of an electric machine, for example an induction motor comprising multiple cooling fins in accordance with an exemplary embodiment of the present invention.

Consistent with one embodiment of the present invention, FIG. 1 represents a representation of a perspective view of a frame 5 or enclosure of an electric machine, for example an induction motor comprising multiple cooling fins 7. A heating element 10 is positioned inside the frame 5 axially inside a bearing bracket (not seen). The heating element 10 comprises a mounting plate and an active heater. The mounting plate comprises one or more tabs for attaching the mounting plate to an inner surface 15 of the frame 5 of the electric machine.

Figure 2:
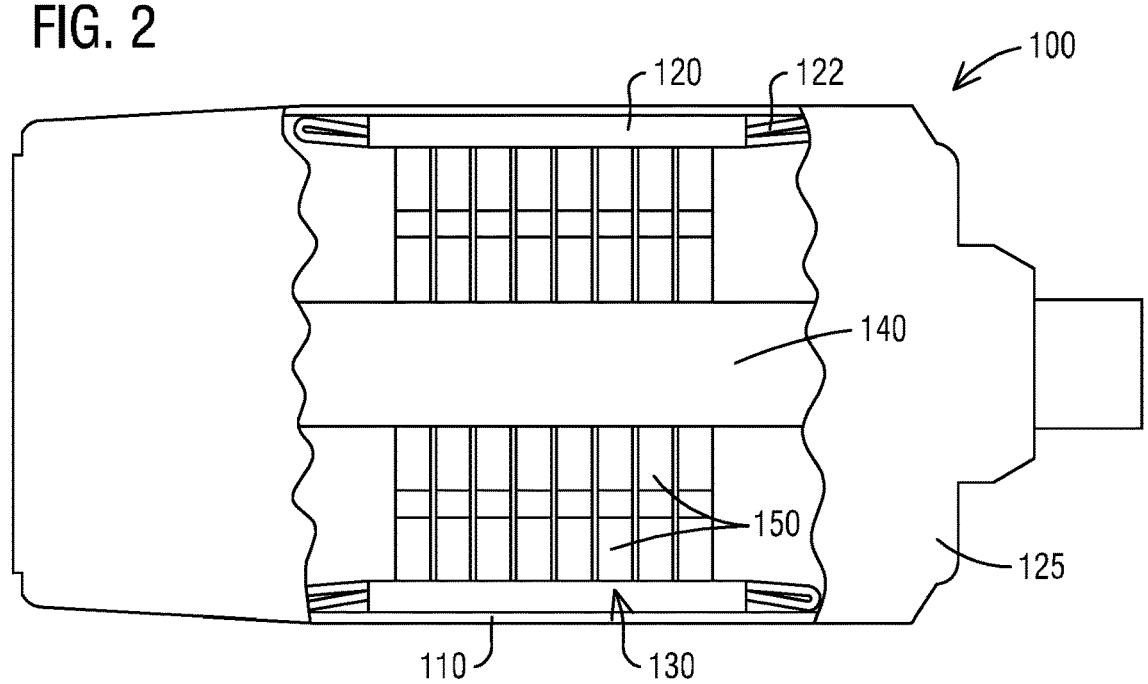
FIG. 2 illustrates schematically a cut away elevational view of an induction motor in accordance with embodiments disclosed herein.

Referring to FIG. 2, it illustrates schematically a partial cut away elevational view of an exemplary induction machine 100, which can be an induction motor or an induction generator, in accordance with embodiments disclosed herein. The exemplary machine 100 is a totally enclosed fan cooled induction motor, it being understood that the present invention may be applied to other types of rotating electrical machines and electric motors that have an insulated winding. The machine 100 comprises a frame or an enclosure 110 and a stator 120 circumferentially oriented therein. The enclosure 110 includes a yoke 125 of an induction motor.

The stator 120 forms a generally annular core into which is axially inserted a rotor assembly 130, which shall hereafter generally be referred to as a rotor. The rotor 130 has a shaft 140 onto which are affixed a stack of abutting rotor laminations 150. The rotor laminations 150, which are flat sheets of insulation coated ferromagnetic metal, e.g., pressed steel, are abutted to form the rotor core. For simplicity, motor components that are not deemed necessary for one skilled in the art to make and use the present invention are not included in the figures.

The rotating electrical machine or electrodynamic machine or the induction machine 100 comprises the enclosure 110 with multiple cooling fins (not shown). A plurality of insulated stator windings 122 of the stator 120 are positioned inside the enclosure 110. A heating element (not seen, see FIG. 1) is positioned inside the enclosure 110. The heating element provides heating of the insulated stator windings 122 while being physically decoupled from an insulation of the insulated stator windings 122.

Figure 3:
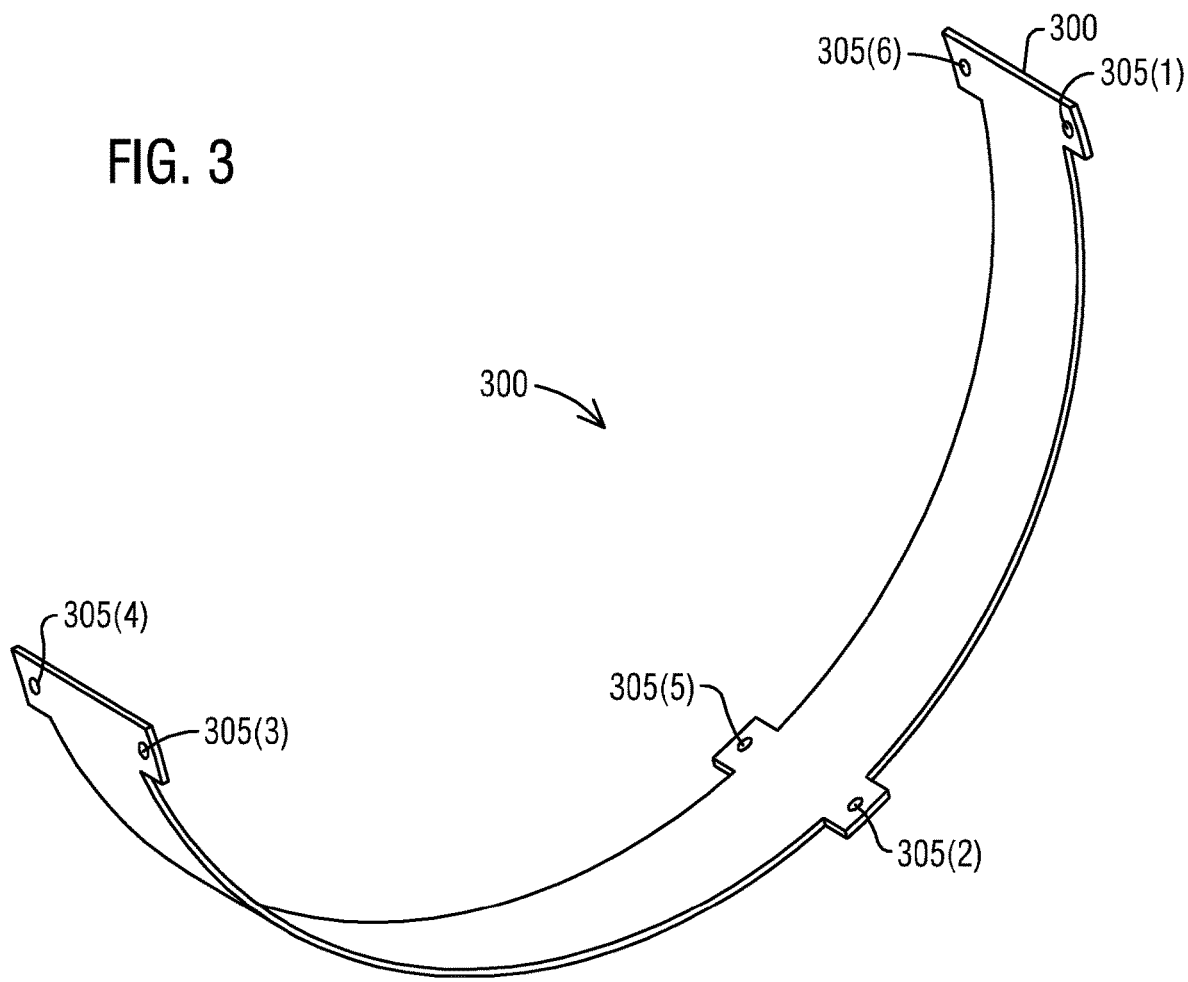
FIG. 3 illustrates a perspective view of a mounting plate of a heating element in that a required size, length, and width are based on an application in accordance with an exemplary embodiment of the present invention.

Turning now to FIG. 3, it illustrates a perspective view of a mounting plate 300 of a heating element in accordance with an exemplary embodiment of the present invention. The mounting plate 300 comprises a rigid or a semi-rigid material such as an aluminum sheet. The mounting plate 300 comprises one or more mounting tabs 305(1-6) for connecting the mounting plate 300 to an inner surface of the enclosure 110.

Figure 4:
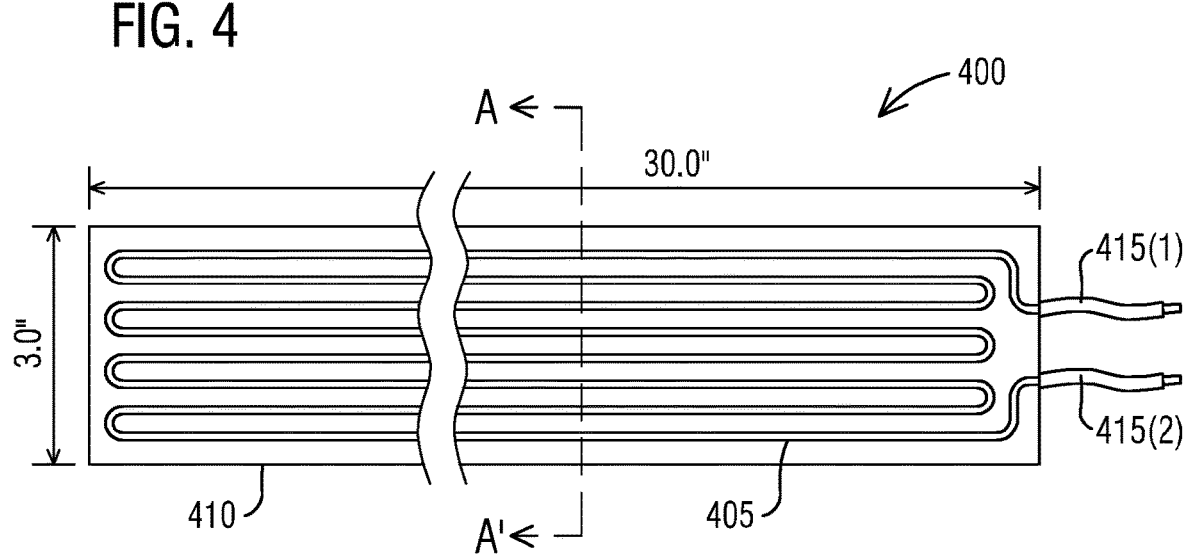
FIG. 4 illustrates a top view of an active heater of a heating element (not visible) in accordance with an exemplary embodiment of the present invention.

FIG. 4 illustrates a top view of an active heater 400 of a heating element in accordance with an exemplary embodiment of the present invention. The active heater 400 comprises a heater wire 405 and a silicone sheath 410. The heater wire 405 has a snake pattern layout such that two connection leads 415(1-2) exit on one end of the active heater 400. The active heater 400 may have a length and a width to suit an application. For example, the length can be 30 inches and a width of 3 inches.

Figure 5:
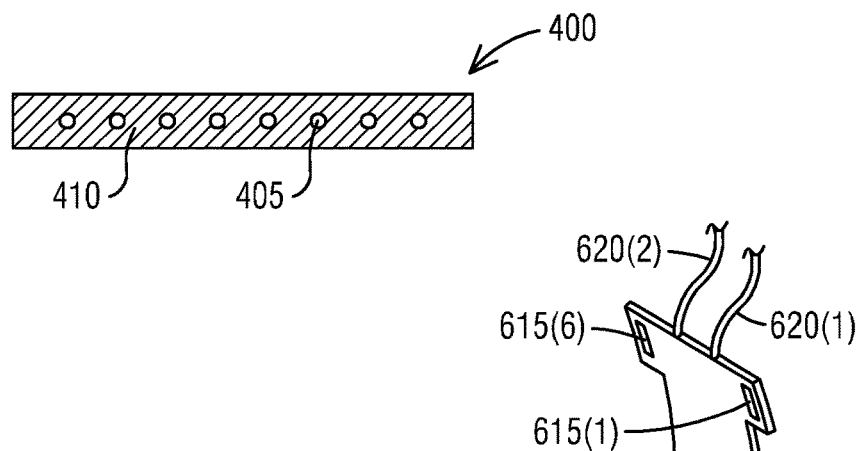
FIG. 5 illustrates a cross-sectional view of the active heater at a line A-A' in FIG. 4 in accordance with an exemplary embodiment of the present invention.

As seen in FIG. 5, it illustrates a cross-sectional view of the active heater 400 at a line A-A' in FIG. 4 in accordance with an exemplary embodiment of the present invention. The active heater 400 comprises the heater wire 405 and the silicone sheath 410. The active heater 400 may have a thickness to suit an application.

Figure 6:
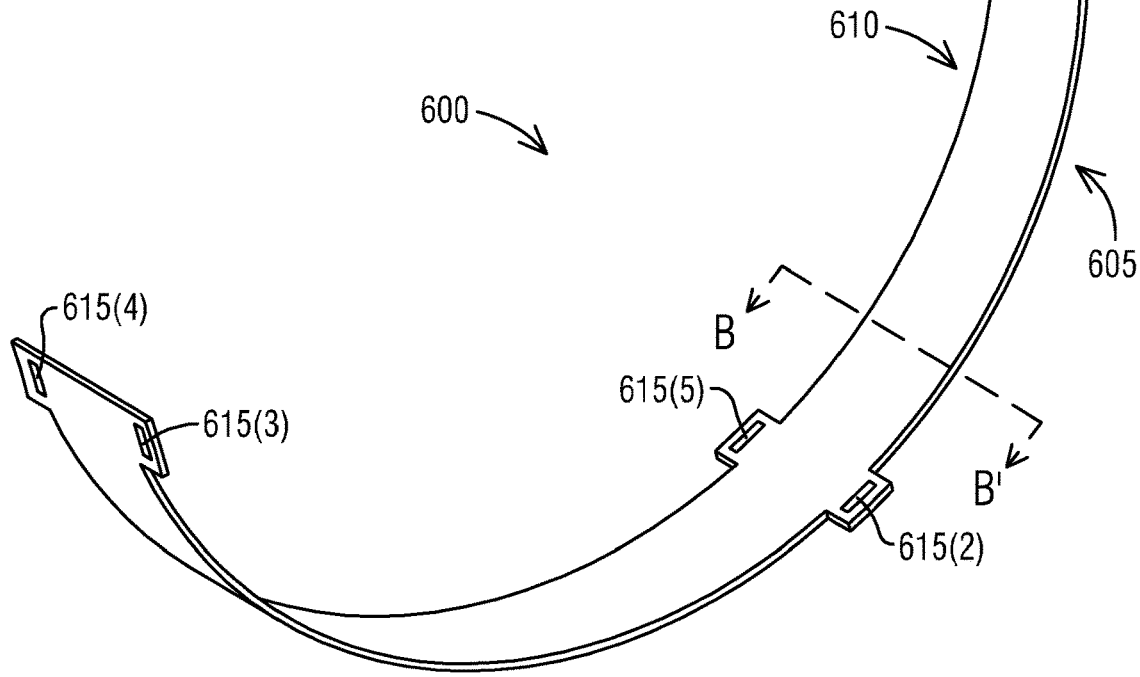
FIG. 6 illustrates a perspective view of a heating element comprising a mounting plate and an active heater in accordance with an exemplary embodiment of the present invention.

As shown in FIG. 6, it illustrates a perspective view of a heating element 600 comprising a mounting plate 605 and an active heater 610 in accordance with an exemplary embodiment of the present invention. The active heater 610 comprises a flat, flexible, silicone-sheathed panel mounted to the mounting plate 605. The active heater 610 is affixed to the mounting plate 605 using a pressure sensitive adhesive rated for high temperatures (>180° C.).

The heating element 600 includes extended mounting tabs 615(1-6). The active heater 610 comes right to a distal edge of the mounting plate 605 but does not cover the extended mounting tabs 615(1-6). The mounting plate 605 is curved to fit circumferentially inside of the motor frame (not shown). That is, the mounting plate 605 is being configured to mount circumferentially on an inner surface of the enclosure 110 of the electrodynamic machine 100. The heating element 600 is thin and curved so as to mount circumferentially on an inside surface of the enclosure 110 being a frame and axially inside bearing brackets for avoiding a contact with the insulated stator windings 122.

The heating element 600 may be in a thin but rigid form that allows the heating element 600 to slide around the insulated stator windings 122 while maintaining a gap that physically decouples the heating element 600 from the insulation of the insulated stator windings 122 thus making removal of the heating element 600 without damage possible. The heating element 600 includes two lead wires 620(1-2) to connect/power the heating element 600. The heating element 600 may be a removable heating element disposed in a small fin-cooled motor.

A small fin-cooled motor may comprise four heaters like the heating element 600 connected as one circuit in series or parallel connection depending upon a desired power available and brought to one terminal box. If needed, more than one heater may be used. For example, the two heaters of the four heaters are disposed on each end of a motor frame or a yoke of the enclosure 110.

Figure 7:
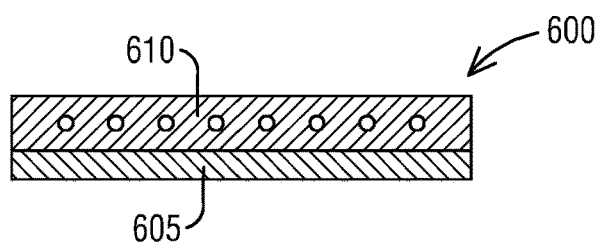
FIG. 7 illustrates a cross-sectional view of the heating element at a line B-B' in FIG. 6 and is shown as an assembly of the mounting plate and the active heater in accordance with an exemplary embodiment of the present invention.

In FIG. 7, it illustrates a cross-sectional view of the heating element 600 at a line B-B' in FIG. 6 in accordance with an exemplary embodiment of the present invention. The active heater 610 and the mounting plate 605 may each have a thickness ½0th of an inch or less.

Figure 8:
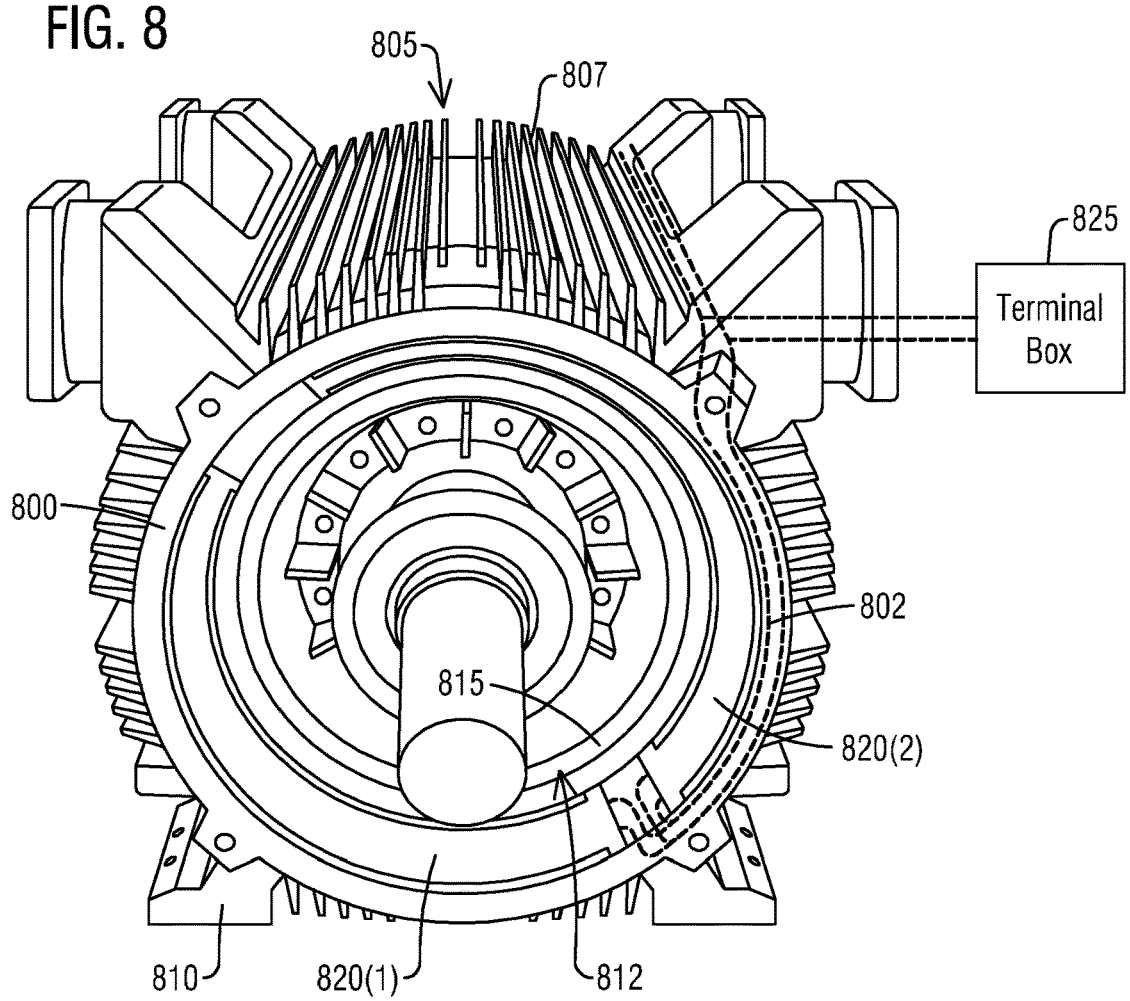
FIG. 8 illustrates a perspective view of a motor frame of a motor comprising wiring of heater elements in accordance with an exemplary embodiment of the present invention.

With regard to FIG. 8, it illustrates a perspective view of a motor frame 800 of a motor 805 such as a small fin-cooled motor comprising wiring 802 of heater elements in accordance with an exemplary embodiment of the present invention. The fin-cooled motor 805 comprises the motor frame 800 with multiple cooling fins 807 and a yoke 810. The fin-cooled motor 805 comprises a stator 812 with insulated stator windings 815 positioned inside the motor frame 800. The fin-cooled motor 805 comprises a plurality of removable heaters 820(1-2) mounted circumferentially between the stator 812 and the motor frame 800 while connected as one circuit in series or parallel connection depending upon a power source availability and brought to one terminal box 825. The plurality of removable heaters 820(1-2) provide heating of the insulated stator windings 815 while being physically decoupled from an insulation of the insulated stator windings 815 of the stator 812. The plurality of removable heaters 820(1-2) may be four heaters that are disposed as one pair on each end of the motor frame 800 or the yoke 810.

Each removable heater of the plurality of removable heaters 820(1-2) is thin and curved so as to mount circumferentially on an inside surface of the motor frame 800 and axially inside bearing brackets for avoiding a contact with the insulated stator windings 815. Each removable heater of the plurality of removable heaters 820(1-2) is in a thin but rigid form that allows the each removable heater to slide around the insulated stator windings 815 while maintaining a gap that physically decouples the each removable heater from the insulation of the insulated stator windings 815 thus making removal of the each removable heater without damage possible.

The plurality of removable heaters 820(1-2) are a new form of space heater used to prevent condensation in motors. It consists of a curved semi-rigid mounting plate (with diameter to match motor frame curvature) with an active, flexible, insulated heater attached to it. It is mounted to the motor frame 800 such that it fits between the stator 812 and frame 800 of the motor 805, but remains physically detached from the stator windings 815 and insulation (an air gap in between). The mounting plate has tabs which are used to attach the plate and active heater of the heating element to the inner surface of the motor frame 800 (for example just inside the bearing bracket). This installation also enables the space heaters to easily be removed and replaced.

The shape and mounting are suitable to fit into small motors, achieve physical detachment from the stator 812, and provide appropriate heating energy (not too much that it induces unsafe temperatures, not too little that condensation can still form).

The specific heater 820 or a heating element used could potentially be different, but there must be an element. The active heater and the mounting plate, if present, must not be permanently attached to other parts of the motor 805. The mounting plate could be optional in the case that the element is rigid enough to support itself, although to be easily removable there must be some sort of mounting locations or mounting tabs/attachment to the heater 820 to allow replacement.

Using a thin metal mounting plate and thin silicone sheathed active heater the structure is thin enough that it can fit around the stator 812 but does not contact it. Therefore the heater 820 is physically detached from the stator 812 (unlike current solutions for small motors which are flexible heaters lashed directly to the stator). Since surface temperature is related to heat flux density, the heater 820 or a heating element is sized such that its surface remains cool enough to prevent ignition of gas or dust in hazardous areas, but power output of the heater 820 or a heating element is high enough to prevent condensation in the electric machine such as the motor 805. This balance is hard to achieve with another current solution, metal tube sheathed heating elements unless a heat flux density is changed. The mounting is also such that it allows for the easy removal and replacement, without damage, which could not previously been done with the solutions of lashing flexible elements to the stator or rigid metal tube sheathed heaters to the motor's bearing brackets.

The heater 820 is mounted circumferentially, between the stator 812 and the motor frame 800, yet not contacting the stator 812. This configuration allows for this form of heater 820 to be used on small motors where space is limited. Use of semi-rigid mounting plate and flexible, insulated heating element in this application such that the heater 820 can be removed and replaced easily, without damaging the motor 805 or insulation.

Other solutions to the problem exist that are simply more costly and tedious to install and maintain (attaching tubular metal heating elements to the inside of the motor's end cap/bearing brackets, for example). However, such a heater or a heating element is flexible and therefore must be mounted to another component in order to hold its position, but there are no convenient areas inside the machine in a conventional configuration where the flexible heating element can be attached.

Figure 9:
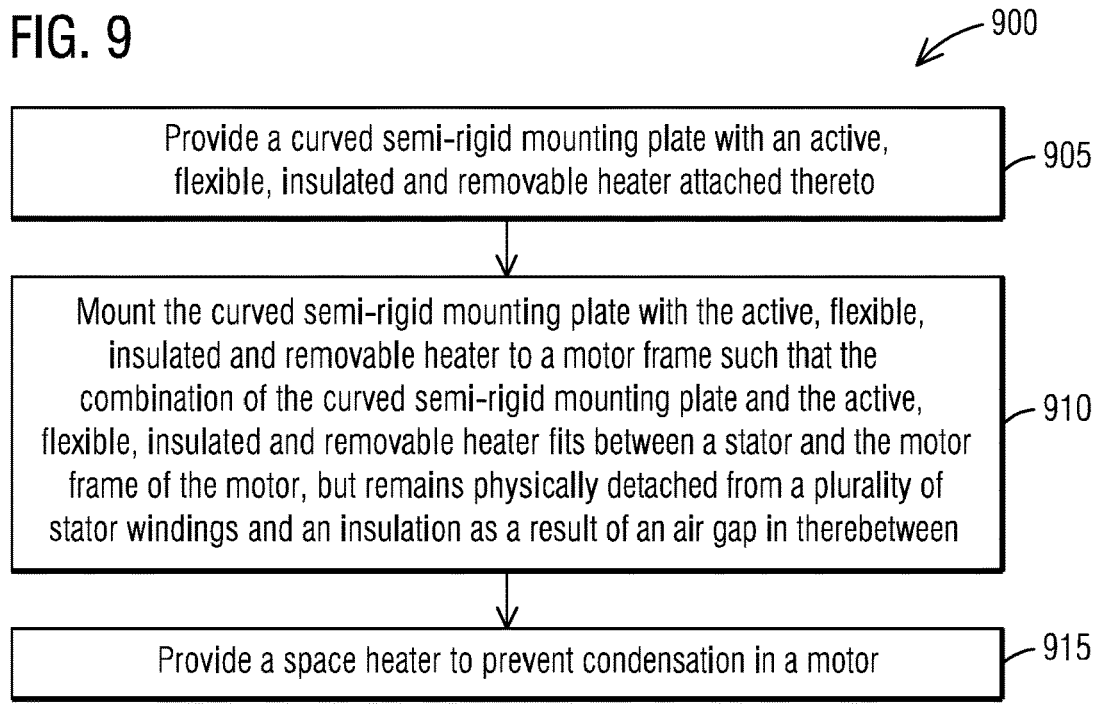
FIG. 9 illustrates a flow chart of a method of providing a space heater to prevent condensation in a motor according to one exemplary embodiment of the present invention.

With respect to FIG. 9, it illustrates a flow chart of a method 900 of providing a space heater to prevent condensation in a motor according to one exemplary embodiment of the present invention. The method 900 comprises providing a curved semi-rigid mounting plate with an active, flexible, insulated and removable heater attached thereto in step 905. In step 910, the method 900 comprises mounting the curved semi-rigid mounting plate with the active, flexible, insulated and removable heater to a motor frame such that the combination of the curved semi-rigid mounting plate and the active, flexible, insulated and removable heater fits between a stator and the motor frame of the motor, but remains physically detached from a plurality of stator windings and an insulation as a result of an air gap in therebetween. The method 900 further comprises in step 915 providing a space heater to prevent condensation in a motor.

The method 900 further comprises providing mounting tabs in the curved semi-rigid mounting plate. The method 900 further comprises using the mounting tabs to attach the curved semi-rigid plate and the active, flexible, insulated and removable heater to an inner surface of the motor frame.

While an induction motor is described here a range of other constructions of electrodynamic machine are also contemplated by the present invention. For example, other types of motors, generators may be implemented based on one or more features presented above without deviating from the spirit of the present invention.

The techniques described herein can be particularly useful for an active heater with a spiral or snake layout. While particular embodiments are described in terms of such an active heater configuration, the techniques described herein are not limited to the snake layout but can also be used with other layouts such as circular or linear layouts.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. A rotating electrical machine comprising:
    an enclosure;
    insulated stator windings positioned inside the enclosure; and
    a heating element positioned inside the enclosure,
    wherein the heating element provides heating for the insulated stator windings through heated air to prevent condensation while being physically decoupled from an insulation of the insulated stator windings, wherein the heating element is curved so as to mount circumferentially on an inside surface of the enclosure being a frame for avoiding a contact with the insulated stator windings, wherein the heating element is a removable heating element, wherein the heating element comprises a mounting plate and a flat active heater affixed to the mounting plate, wherein the mounting plate is thin and comprises one or more mounting locations for connecting the mounting plate to the inner surface of the enclosure, and wherein the heating element is configured to slide around the insulated stator windings while maintaining a gap that physically decouples the heating element from the insulation of the insulated stator windings thus making removal of the heating element without damage possible.

2. The rotating electrical machine of claim 1, wherein the heating element comprises, wherein the mounting plate being configured to mount circumferentially on the inner surface of the enclosure of an electrodynamic machine.

3. The rotating electrical machine of claim 2, wherein the active heater comprises a sheathed panel mounted to the mounting plate.

4. The rotating electrical machine of claim 2, wherein the mounting plate comprises a metallic sheet.

5. The rotating electrical machine of claim 2, configured as an induction motor.

6. The rotating electrical machine of claim 1, the heating element further comprising:
a pair or more than a pair of heaters connected as one circuit in series or parallel connection depending upon a power available and brought to one terminal box.

7. The rotating electrical machine of claim 1, wherein the enclosure is a motor frame or a yoke and wherein the heating element comprises four heaters out of which two heaters of the four heaters are disposed on each end of the motor frame or the yoke.

8. A fin-cooled motor comprising:
a motor frame with multiple cooling fins and a yoke;
a stator with insulated stator windings positioned inside the motor frame; and
a plurality of removable heaters mounted circumferentially between the stator and the motor frame while connected as one circuit in series or parallel connection depending upon a power available and brought to one terminal box, wherein the plurality of removable heaters provides heating for the insulated stator windings through heated air while being physically decoupled from an insulation of the insulated stator windings of the stator, wherein the plurality of removable heaters is curved so as to mount circumferentially on an inside surface of the motor frame for avoiding a contact with the insulated stator windings, wherein each of the plurality of removable heaters comprises a mounting plate and a flat active heater affixed to the mounting plate, wherein the mounting plate is thin and comprises one or more mounting locations for connecting the mounting plate to the inner surface of the motor frame, and wherein each of the plurality of removable heaters is configured to slide around the insulated stator windings while maintaining a gap that physically decouples each of the plurality of removable heaters from the insulation of the insulated stator windings thus making removal of each of the plurality of removable heaters without damage possible.

9. The fin-cooled motor of claim 8, wherein the plurality of removable heaters is four removable heaters that are disposed as one pair on each end of the motor frame or the yoke.

10. The rotating electrical machine of claim 1, wherein the heating element includes extended mounting tabs such that the flat active heater comes right to a distal edge of the mounting plate but does not cover the extended mounting tabs.

11. The fin-cooled motor of claim 8, wherein each of the plurality of removable heaters includes extended mounting tabs such that the flat active heater comes right to a distal edge of the mounting plate but does not cover the extended mounting tabs.

* * * * *